United States Patent
Muraoka (10) Patent No.: US 6,763,002 B1
(45) Date of Patent: Jul. 13, 2004

(54) METHOD AND APPARATUS FOR CONTROLLING DATA TRANSMISSION ACCORDING TO QUALITY OF COMMUNICATION LINE

(75) Inventor: Shinya Muraoka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/389,750

(22) Filed: Sep. 7, 1999

(30) Foreign Application Priority Data

Sep. 9, 1998 (JP) .......................................... 10-272510

(51) Int. Cl.⁷ ................................................ H04B 1/44
(52) U.S. Cl. ...................... 370/282; 370/230; 370/252
(58) Field of Search ............................... 370/470, 252, 370/322, 535, 229–240, 282, 463, 355, 424, 395.1, 321, 352, 353; 714/752, 758; 358/434, 445, 442, 400; 455/560

(56) References Cited

U.S. PATENT DOCUMENTS

| | | | | |
|---|---|---|---|---|
| 5,172,375 A | * | 12/1992 | Kou | ............................ 370/322 |
| 5,428,611 A | * | 6/1995 | Jain et al. | .................... 370/470 |
| 5,461,618 A | * | 10/1995 | Chen et al. | .................. 370/470 |
| 5,638,384 A | * | 6/1997 | Hayashi et al. | ............. 714/752 |
| 5,671,223 A | | 9/1997 | Shachar et al. | ............. 370/471 |
| 5,717,761 A | | 2/1998 | Yatagai | ...................... 380/261 |

FOREIGN PATENT DOCUMENTS

| | | |
|---|---|---|
| JP | 60-256238 | 12/1985 |
| JP | 62-163438 | 7/1987 |
| JP | 62-290245 | 12/1987 |
| JP | 63-20933 | 1/1988 |

OTHER PUBLICATIONS

European Search Report dated Feb. 25, 2002.
Canadian Office Action dated Jul. 11, 2003.

* cited by examiner

Primary Examiner—John Pezzlo
(74) Attorney, Agent, or Firm—McGinn & Gibb, PLLC (57) ABSTRACT

In order to control the transmission interval of unique words inserted at the top of a plurality of HDLC frames in accordance with the quality of the transmission line, a transmitting and receiving system is provided, in which the transmission interval is changed in accordance with the HDLC responses included in the receiving data.

Examples of the HDLC responses includes RR (Receive Ready), RNR (Receive Not Ready), and REJ (Reject).

25 Claims, 11 Drawing Sheets

METHOD AND APPARATUS FOR CONTROLLING DATA TRANSMISSION ACCORDING TO QUALITY OF COMMUNICATION LINE

BACKGROUND OF THE INVENTION

1. Field of the Invention

The present invention relates to a method for controlling data transmission in accordance with the quality of a communication line, and particularly relates to a method of controlling a transmission interval of a "proper pattern" which is inserted at the top of a plurality of HDLC frames, by monitoring HDLC responses included in received signals. Here, HDLC is an abbreviation of High Level Data Link Control Procedure. The "proper pattern" is called a "Unique Word".

2. Background Art

The HDLC is a communication procedure which is internationally standardized in order to efficiently execute communication and communication control between data terminals such as computers and engineering work stations which constitute a network.

Figure 1:
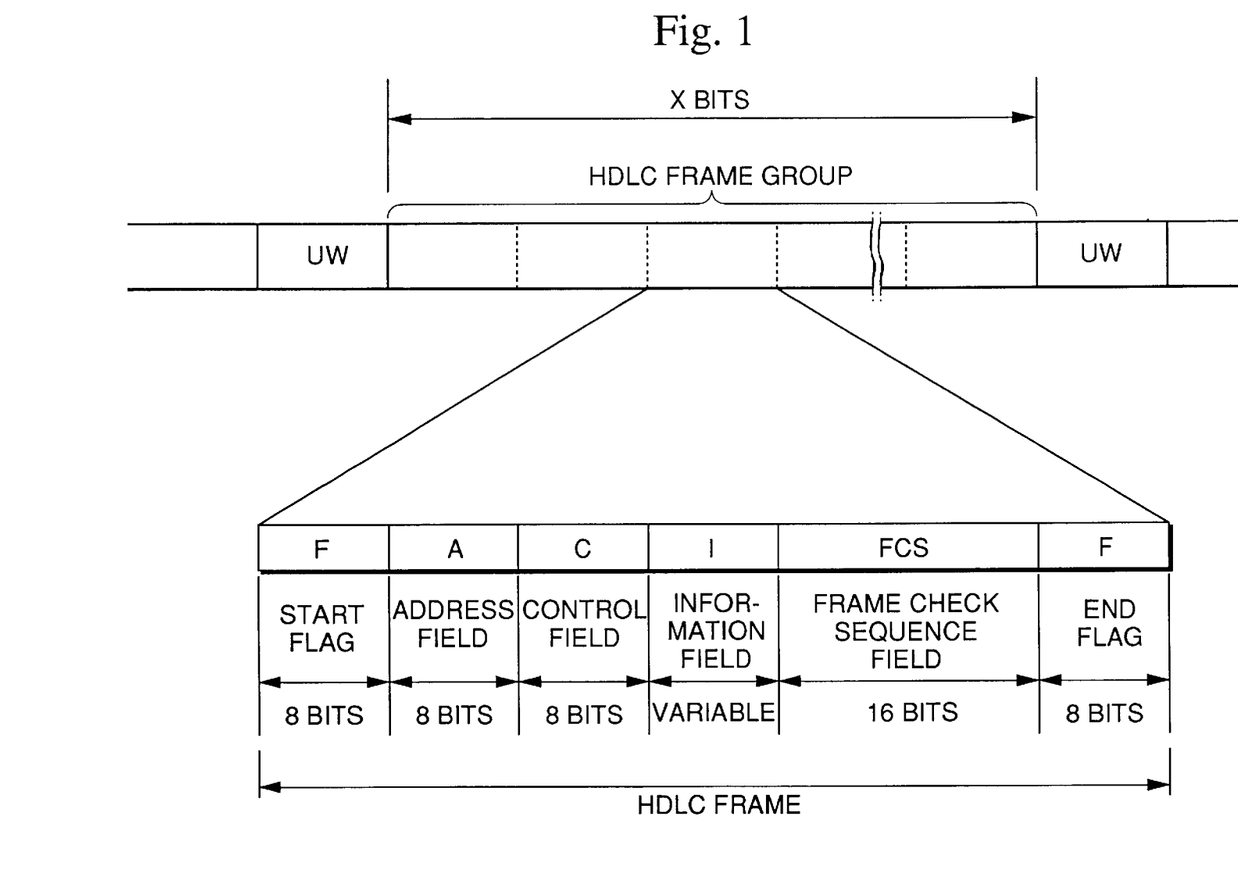
FIG. 1 is a diagram of a format composed of a plurality of HDLC frames headed by the unique words of the present invention.

FIG. 1 illustrates a plurality of HDLC frames headed by the unique words (UW), and in the present application, a plurality of HDLC frames are called "an HDLC frame group" or "multi-frames". The unique words are used for detecting the head of each frame group and for determining the timings of transmission and reception.

Each HDLC frame which constitutes an HDLC group (multi-frames) headed by respective unique words is composed of, as shown in FIG. 1, a start flag (F), an address field (A), a control field (C), an information field (I), a frame check sequence field (FCS), and an end flag (F).

The commands of frames or the content of responses are designated in the control field (C). Naturally, the HDLC command is included in the transmitted signals, and the HDLC response is included in the received signals. Examples of the responses related to the present invention include RR (Receive Ready), RNR (Receive Not Ready) or REJ (Reject). The transmitting or receiving data is inserted in an information portion (I) frames, and the data length is variable.

If the RNR response is included in the receiving frame, since it means that the opposite data terminal (an opposite station) is not ready to receive data, the data transmission will not be executed. In contrast, if the RR response is included in the receiving frame, since it means that the opposite data terminal is ready to receive data, the data transmission is executed. If the REJ response is included in the receiving frame, the data transmission is executed again since the opposite terminal request re-sending of data.

However, in conventional multi-frame HDLC data transmission, the transmission interval of unique words has been fixed at a constant value, irrespective of a quality of a communication line. Thus, this conventional example (hereinafter, referred to as the first conventional example) has had problems which will be described in a later section.

In contrast, Japanese Patent Application, First Publication No. Sho 63-20933 discloses a technique for optimizing the length of the HDLC frame according to the quality of the communication line (hereinafter, referred to as the second conventional example). According to this conventional technique, a line quality monitoring portion obtains an error generation rate per unit time based on "the amount of error control processing", and the frame length is determined so as to minimize the data transmission time in response to the thus obtained error generation rate.

Furthermore, Japanese Patent Application, First Publication No. Sho 62-163438, discloses a technique in a packet exchange system using the HDLC procedure, which evaluates the quality of the communication line periodically by measuring the number of frames corrupted due to bit errors, and transmitting the data after dividing the data into packets having short data lengths, if the quality of communication line is not satisfactory (hereinafter, called the third conventional example).

In the above first conventional example, the transmission interval of the unique words UW has been fixed and is not been related to the quality of the transmission line. Thus, even if the transmission quality is degraded and the REJ response (which is equivalent to the demand for re-sending) arrives from the opposite data terminal, the bit length of the unique word and the series of the following HDLC (a transmission unit) is maintained at the same length as that of the case of a malfunction caused just before the reception of data. Under such a circumstance, it is likely that the REJ responses are repeatedly generated, which results in causing the problem of reducing the transmission efficiency.

In contrast, the second and third conventional examples control the length of the HDLC frame itself in response to an assumption of the line quality based on the error generation number. However, the error generation number is not directly interrelated with the line quality; thus, the problem arises that the frame length is sometimes reduced to become unnecessarily short.

SUMMARY OF THE INVENTION

It is therefore an object of the present invention to provide a transmission system which is capable of solving the above problems associated with the conventional techniques, since the present transmission system judges the quality of the communication line by monitoring HDLC responses issued by the opposite data terminal and controls the transmission intervals of the unique words.

According to the first aspect of the present invention, the present invention provides a method for controlling data transmission in accordance with the quality of a communication line comprising transmitting a plurality of frames defined by the High Level Data Link Control Procedures (HDLC) by dividing with unique words, the method comprising the step of: changing the interval of transmitting the unique words in accordance with the HDLC response included in the received signal.

Examples of the HDLC responses include RR (Receive Ready), RNR (Receive Not Ready), and REJ (Reject).

According to the second aspect of the present invention, the present invention provides a transmitting and receiving system for transmitting and receiving a plurality of frames defined by the HDLC by dividing unique words, the system comprising: a HDLC monitoring circuit for detecting said HDLC response included in the received signals; a unique word generating circuit for outputting a selected unique word among a plurality of unique words in response to the HDLC response detected by said HDLC monitoring circuit; a multiplexing circuit for multiplexing the unique word selected by said unique word generating circuit with the transmitting data; and a transmitting circuit for transmitting the output of said multiplexing circuit.

DETAILED DESCRIPTION OF THE INVENTION

Hereinafter, the first embodiment of the present invention will be described with reference to FIGS. 1 to 5.

A system for executing the present invention includes equipment for transmitting information data output from a data terminal connected to the one apparatus through a transmission line to another data terminal disposed at another location by use of a HDLC protocol. An example of the communication line is the satellite communication line. The practical data for transmitting and receiving through the communication line is composed of a unique word for determining the top of the multi-frame (an HDLC frame group), information data included in each HDLC frame, and control data. The term "data" means data to be transmitted and various control data.

Figure 2:
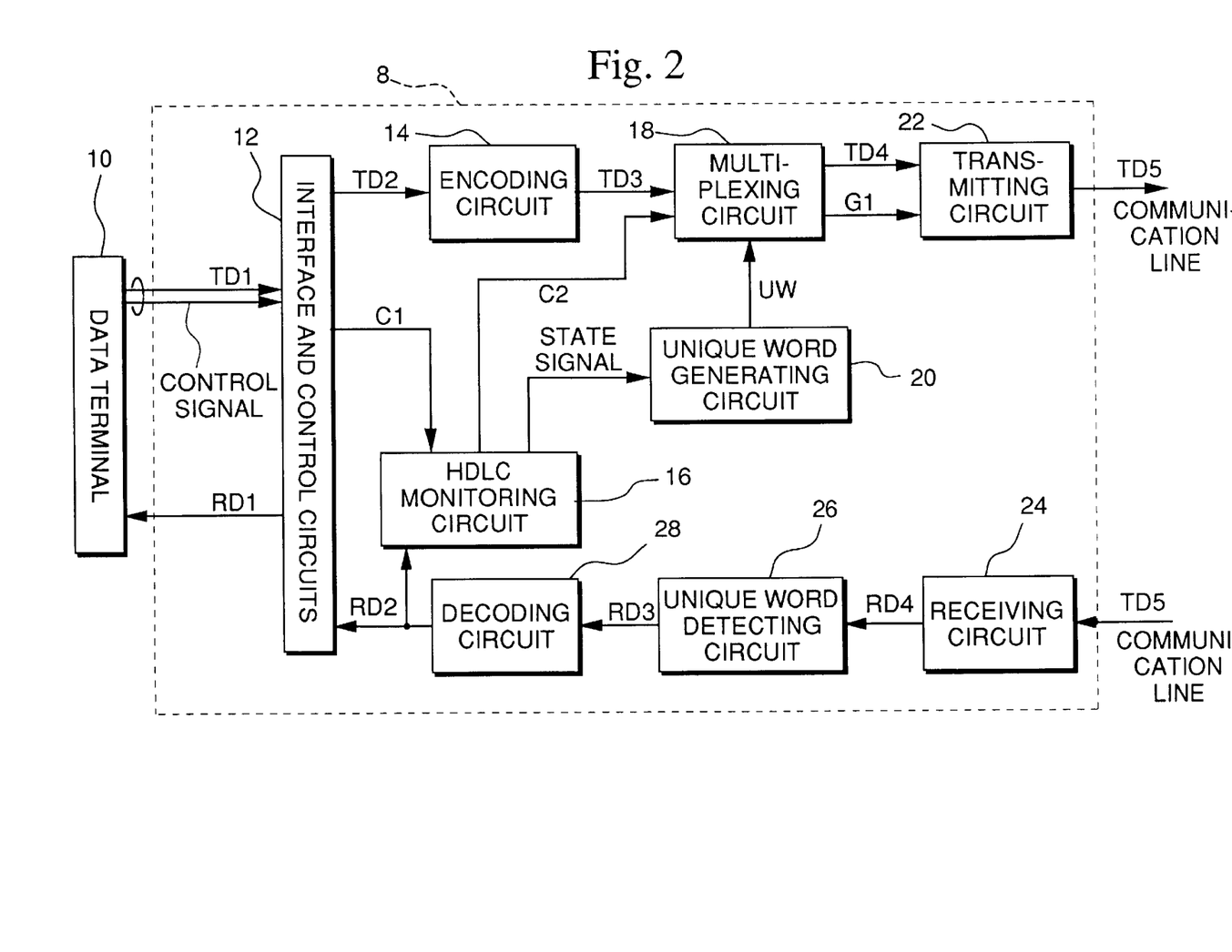
FIG. 2 is a block diagram showing the first embodiment of the present invention.

Referring to FIG. 2, the information data TD1 output from the data terminal 10 and the control signal are input into "the interface and the control circuit" 12 which constitutes a part of transmitting and receiving apparatus 8. The control circuit 12 executes a level transformation, extraction of the information data by excluding start/stop bits and parity bits, and conversion to a predetermined transmission rate. The control circuit 12 further produces the control data for HDLC frames shown in FIG. 1 based on the control signal from the data terminal 10 and inputs the thus produced control data into the coding circuit 14 at the next stage together with the information data as TD2. Here, for example, RS232C and RS422 are used as the interfaces.

The control circuit 12 sets the logic level of the control signal C1 to "1", if the information data is included in the output TD2, and sets the logic level of the control signal to "0", if the information data is not included, and the control signal C1 is supplied to the HDLC monitoring circuit.

The coding circuit 14 executes specified coding processes (for example, scramble and convolutional coding) and outputs the processed data as TD3 to the multiplexing circuit 18. This multiplexing circuit 18 multiplexes the data TD3 with the unique word from the unique word generating circuit 20 when the logic level of the control signal C2 from the HDLC monitoring circuit 16 is "1" and the thus multiplexed data is output to the transmitting circuit 22 as the multiplexed data TD4.

When the logic level of the control signal C2 is "0", then the multiplexing circuit outputs only the unique word UW, ignoring the data TD3.

When the control signal G1 is designated "1", the transmitting circuit 22 executes conversion of the transmitting data TD4 such as digital/analog conversion or a frequency conversion so as to be suitable for a communication line, and sends the data to the communication line as TD5. In contrast, when the control signal G1 is "0", the transmitting circuit 22 stops the operation of transmitting data to the communication line.

The transmission of data to the communication line is described above, and reception of data from the communication line will be described hereinafter.

The receiving circuits 24 executes signal processing for the data RD5 from the communication line, and the processing is executed in the direction opposite to the processing at the transmitting circuit 22, and the processed data is output as the data RD4 to the unique word detecting circuit 26 after being converted into digital signals with the base band frequency. This unique word detecting circuit 26 detects the unique word from the received data RD4, and output data RD3 excluding the unique word is output to the decoding circuit 28. In the decoding circuit 28, the signal processing (such as error detection or descramble) opposite to that executed in the coding circuit 14 is carried out and the decoded data RD2 is output to "the interface and the control circuit"12. The control circuit 12, similar to the data processing executed to the data TD1, executes the interface processing such as the level transformation and then outputs it to the data terminal 10.

The HDLC monitoring circuit 16 detects the received responses (RR, RNR, REJ etc.) by monitoring the control fields of each frame in the received data RD3. The HDLC monitoring circuit 16, based on the detected response, outputs a conditional signal (conditional signal 1, 2, and 3) for setting one situation out of three transmitting situations (transmitting situations 1, 2, and 3).

Figures 3A, 3B:
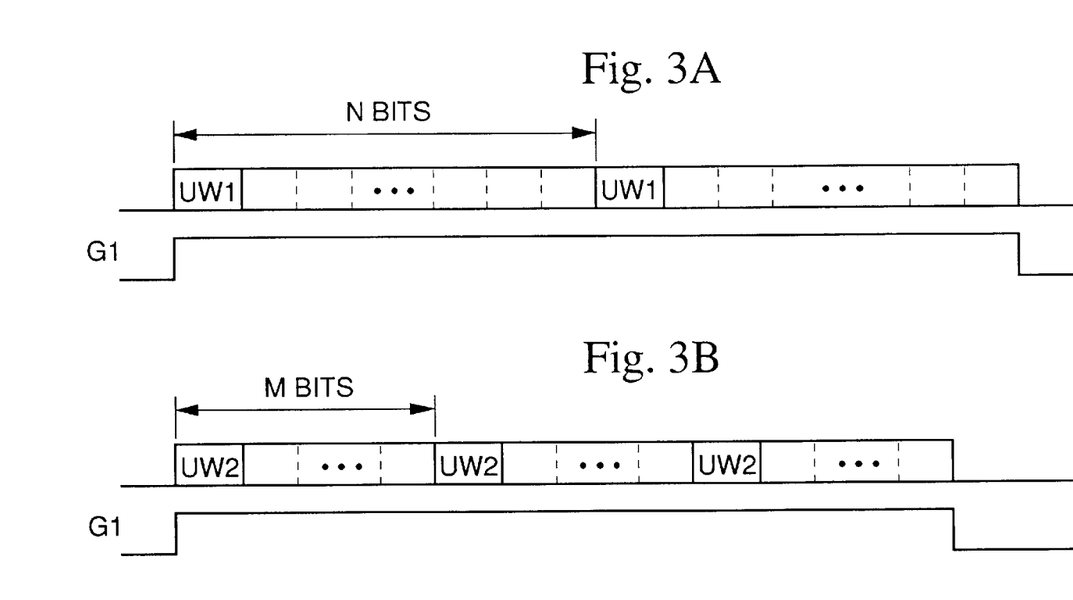
FIGS. 3A, 3B, and 3C are diagrams for explaining the operation of the first embodiment of the present invention.
Figure 3C:
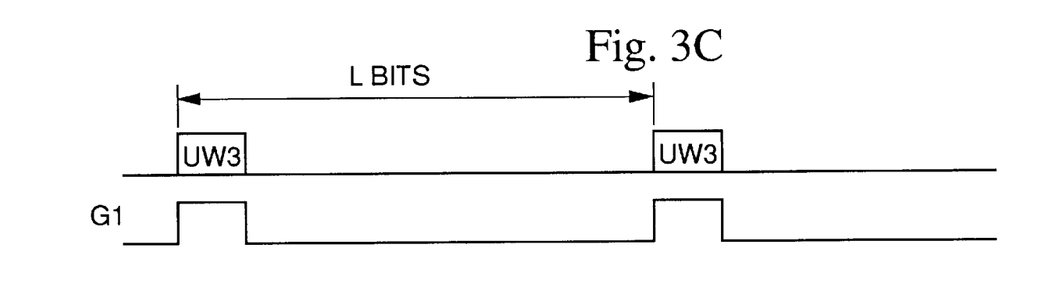

The unique word generating circuit 20 changes the type of the unique words and their transmission intervals in response to the state signal from the HDLC monitor circuit 16 as shown in FIG. 3. The unique word generating circuit 20 generates UW1 (FIG. 3 (A)) every N bits when it receives the state signal 1 showing a transmission state 1, generates UW2 (FIG. 3(B)) at every M bits when it receives the state signal 2 showing the transmission state 2, and generates UW3 (FIG. 3 (C)) at every L bits when it receives the state signal 3 showing the transmission state 3, and outputs these UWs to the multiplexing circuit 14. Although these unique words have the same bit numbers, they have different patterns, and N>M. That is, the smaller number of the unique words in the transmission state 1 makes it possible to transfer data with the larger bit number.

Therefore, when the receiving condition of the opposite station is good, the number of transmitted unique word is decreased in order to raise the through-put, while, when the receiving condition is not good, the number of transmitting the unique words is increased so as to take precedence in order to restore the transmitting situation of the opposite station.

Figure 4:
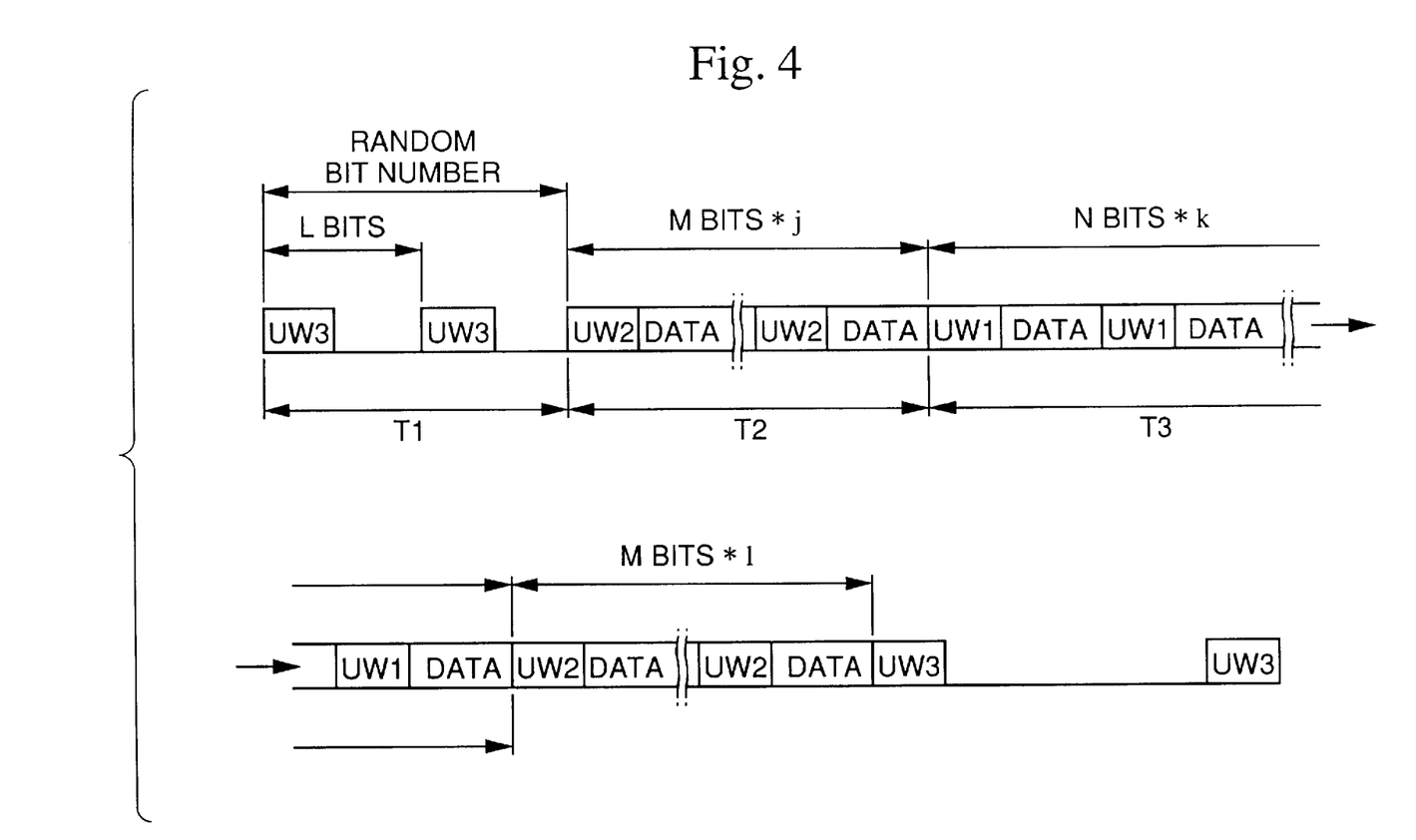
FIG. 4 is a diagram for explaining the operation of the first embodiment of the present invention.

FIG. 4 shows a change of the transmitting state or the transmitting condition of an apparatus 8 (shown in FIG. 1). FIG. 4 simply illustrates the situation of the apparatus 8, starting from the transmitting state 3, shifting to the transmitting condition 2, and returning to the transmitting state 1. In order to simplify the drawing, the data portion containing information and the control data, which follow UA2 and UA3, are simply denoted by "data".

Figure 5:
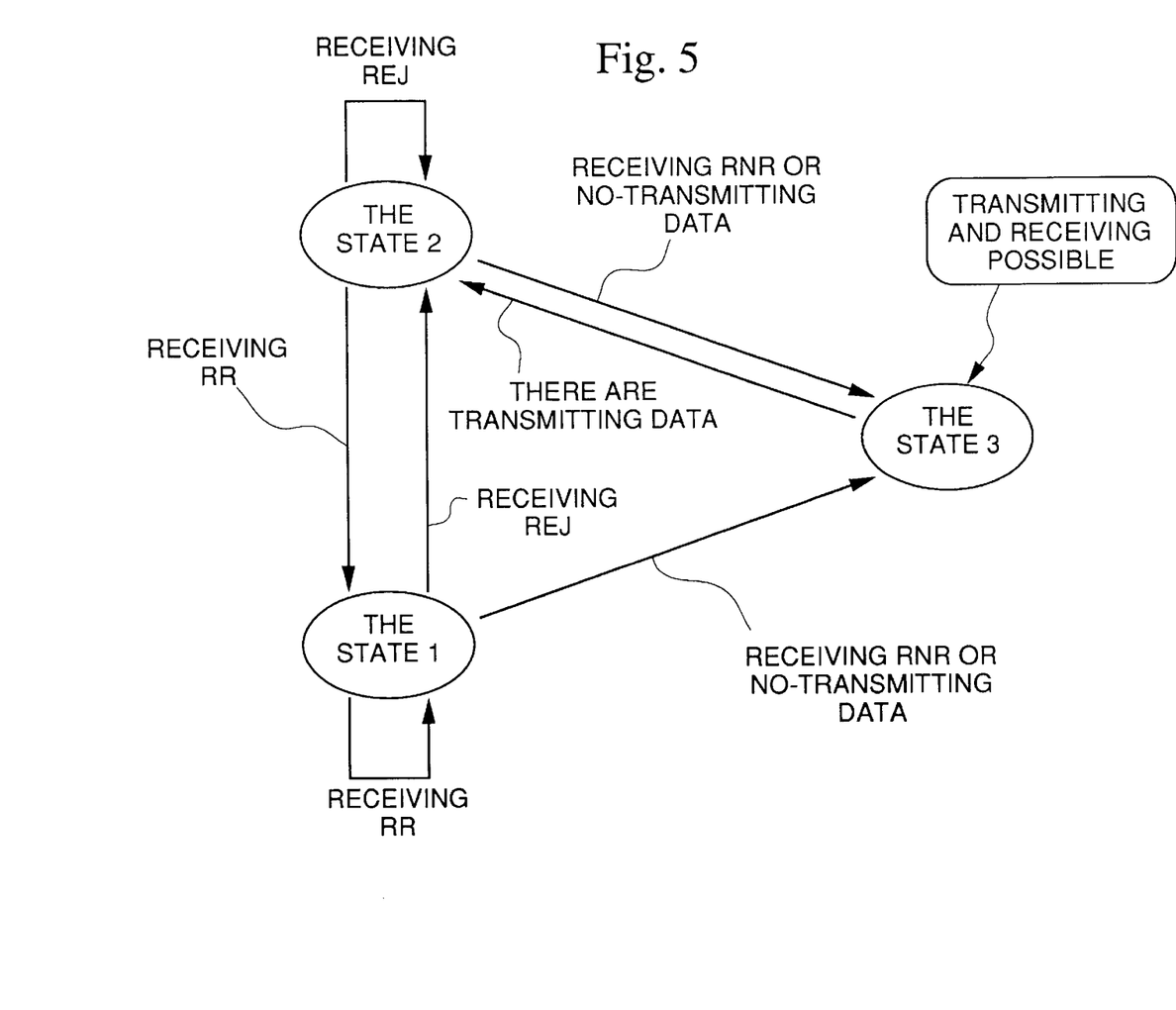
FIG. 5 is a diagram for explaining the operation of the first embodiment of the present invention.

Hereinafter, the operations of the unique word generating circuit 20, the unique word detecting circuit 26, and the HDLC monitoring circuit 16 are described with reference to FIG. 5.

First, the data transmission will be explained. When it is confirmed from the result of monitoring the received data RD2 that the setting of one multi-link between a data terminal and another data terminal (or the opposite station) is completed, the HDLC monitoring circuit 16 shifts to the transmitting state 3 shown in FIG. 5.

In order to shift to the transmitting state 3, the HDLC monitoring circuit 16 outputs a state signal 3 indicating the transmitting condition 3 to the unique word generating circuit 20, and furthermore, outputs the control signal C2 to the multiplexing circuit 18 after converting the logic level of the control signal into "0". At this time, the unique word generating circuit 20 sends the unique word UW3 for each L bit. Since the control signal C2 is "0", the multiplexing circuit 18 ignores the data TD3 and outputs only the unique word UW3 as TD4. The transmitting condition of the data TD4 becomes in a state such that as that shown in FIG. 3C. This does not intend to transmit the data, and the object is to protect the transmission line, preventing shifting of the timing of transmitting and received signals at data terminals where transmission and reception are executed, by periodically transmitting unique words when the data transmission is not executed. Here, since the timing of the data transmitted first from the data terminal 10 is not synchronous, the length of the section T1 is optional.

Subsequently, since the control signal C1 is converted to "1" in the case of outputting the transmitted data from the data terminal 10, the HDLC circuit 16 outputs the state signal 2 to the unique word generating circuit 20 in order to change the transmission state 2, and outputs the control signal C2 to the multiplexing circuit 4 after converting the control signal into "1".

As described above, when the data transmission from the data terminal 10 starts first, the transmitting condition changes into the transmitting condition 3 through the transmitting condition 2. The reason for this is that the HDLC response is not delivered from the opposite terminal immediately after the data transmission is started.

The transmitting condition 2 implies that the HDLC monitoring circuit 16 is not certain whether the communication line at the opposite terminal is unstable or that the receiving condition at the opposite terminal is satisfactory. Accordingly, the unique word generating circuit 20 sends UW2 by each M bit to the multiplexing circuit 18, and, since the control signal C2 is "1", the multiplexing circuit 18 supplies the data TD4 obtained by multiplexing the data TD4 and UW2 to the transmitting circuit 22. The data TD4 is in the form shown as (B) in FIG. 3, and the section T2 in FIG. 4. In addition, as described above, the timing of the data first transmitted from the data terminal 10 is not synchronous, and thus the length of the section T1 of FIG. 4 is optional. Further, the transmitting timing of the first UW2 is also not synchronous.

As described above, when the apparatus 8 is in a transmitting condition 2, the HDLC monitoring circuit 16 monitors the HDLC response included in the control field of the data RD2 for judging whether or not the transition to the next state is appropriate or not.

For example, when the monitoring circuit 26 detects the REJ response, the opposite terminal requires re-sending of data which has already been transmitted by the apparatus 8 shown in FIG. 1. Accordingly, the HDLC monitoring circuit 16 judges that the receiving condition is not satisfactory, and outputs the state signal 2 continuously in order to raise the probability for delivering the re-sending data to the opposite terminal.

In contrast, if the monitoring circuit 16 detects the RR response, while the apparatus 8 is in transmission state 2, it indicates that the opposite terminal is satisfactorily receiving the signals transmitted by the apparatus 8 in FIG. 1. That is, since the RR response indicates the receiving condition of the opposite terminal is satisfactory, the monitoring circuit 16 outputs the state signal 1, indicating the transmitting condition 1, to the unique word generating circuit 20 and also transmits the control signal 2 to the multiplexing circuit 18 after converting it into "1".

Furthermore, if the monitoring circuit 16 detects the RNR response while the apparatus 8 is in the transmitting condition 2 or 1, since this response indicates that the opposite terminal is busy, it is necessary to change the transmitting condition to the transmitting condition 3. Accordingly, the monitoring circuit 16 outputs the state signal 3, indicating that the transmitting condition is 3, to the unique word generating circuit 20 and stops then transmission of data from the data terminal 10 by outputting the control signal C2 to the multiplexing circuit 18 after switching it to "0" (the multiplexing operation is stopped).

Similarly, when the data (inducing the data requested to be re-sent) from the interface circuit 12 is not output, the control signal C1 is switched to "0", and the monitoring circuit 16 outputs the state signal 3 in accordance with the "0" condition of the control signal Cl to the unique word generating circuit 20, and, at the same time, the control signal C2 is switched to "0".

When the apparatus 8 has transferred to the transmitting state 1, the unique word generating circuit 20 outputs the UW1 by each N bit to the multiplexing circuit 18 and, since the control signal C2 is "1", the multiplexing circuit 18 outputs the data TD4 obtained by multiplexing the data TD3 and UW1 to the transmitting circuit 22. Accordingly, since N>M, and since the number of transmitted unique words is the smallest, when the transmitting condition is 1, the amount of transmitted data is large and the throughput of the data is also large. The data TD4 has the format (A) shown in FIG. 3 and the section T3 shown in FIG. 4.

When a type of the unique word changes to the other type except when the transmitting state signal is the condition 3, the unique word generating circuit 20 transmits a unique word of the next condition at a timing which is an integer times the transmitting timing of the unique word in the preceding transmitting condition. That is, when the transition takes place from the transmitting condition 2 to 1, transmission of UW1 starts after the M bit x integer times from the top of the UW2 so as to be situated at the boundary line between the section T2 and T3.

When the monitoring circuit 16 is at the following state outputting the state signal 1 indicating the transmitting condition 1, and when the REJ response is not detected, the monitoring circuit 16 judges that the receiving condition of the opposite terminal is unsatisfactory, similar to the case of the transmitting condition 2, and transmits a signal 2 indicating the condition 2 to the unique word generating circuit 20. That is, this means that the quality of the transmission is given priority over the throughput. In contrast, when the apparatus 8 receives the RR response while in satisfactory transmitting condition, the apparatus 8 recognizes that the transmitting condition of the opposite station is satisfactory and maintains the transmitting state 1. Further, when the apparatus 8 receives the RNR response after transmitting the transmitting condition 1, since this signal indicates that the opposite station requires terminating the data transmission, the state signal 3 for switching the transmission state into 3 is transmitted to the unique word generating circuit 29, and after the control signal C2 is switched into "0" it is then output to the multiplexing circuit 18.

When the data output from the data terminal 10 is stopped and also when the "interface and the control circuit" 12 does not have any data to be transmitted (including data required to be re-transmitted), the transmitting condition is transferred to the transmitting condition 2.

When the HDLC monitoring circuit 10 outputs the state signal 3 and when the transmitting condition transits to the transmitting condition 3 without receiving the RNR response or without receiving any data, while the transmitting data is in the condition 1 or 2 just before the transmission, and when further receiving the RR or REJ response, the transition takes place only when the control signal C2 is in "1".

Next, the operation at the receiving side is described.

When there is no receiving data, the unique word detecting circuit 20 always searches for a unique word in the receiving data RD4. Although the operation of the unique word detecting circuit 20 differs depending on the type of the detected unique word, the unique word for search includes whole unique words.

First, when UW3 is detected, the unique word detecting circuit 20 outputs nothing to the decoding circuit 28, and starts searching for the unique word from the bit following the latest bit of UW3. When UW2 is received, the unique word detecting circuit 20 outputs a bit string of (M-UW2) bits starting from the bit following the latest bit of UW2 to the decoding circuit 28 as RD3. Subsequently, the unique word searching circuit 20 reopens searching after M bits from the top bit of the detected UW2. When UW1 is received, the unique word detecting circuit 20 outputs a bit string of (N-UW1) bits starting from the bit following the latest bit of the UW1 to the decoding circuit 28 as RD3. Subsequently, the unique word searching circuit 20 reopens searching after N bits from the top bit of the detected UW1.

The first feature of the above described first embodiment is in that, when the receiving condition of the opposite station is satisfactory by setting N>M, the amount of the transmitting data is increased as much as the decreasing number of the unique word transmission for increasing the throughput; and when the receiving condition is not satisfactory at the transmitting condition of 2, the number of unique word transmissions is decreased to less than that in the transmitting state 1 so as to stabilize the transmission line.

The second feature of the first embodiment is that the judgement of the receiving condition of the opposite terminal is not executed by introduction of the new error rate measuring system.

Hereinafter, the second embodiment of the present invention will be described with reference to FIGS. 6 to 11. In these figures, except those necessary for describing the second embodiment explanations of these elements and operations already explained in the explanation of the first embodiment are omitted.

The object of the second embodiment is to reduce the quantity of processing by the detecting circuit 27 to less than that in the first embodiment by reducing the number of types of unique word from three to two.

In order to attain the above purpose, a delay circuit 30 is added to the system according to the first embodiment. Furthermore, since the HDLC monitoring circuit 16, the unique word generating circuit 20, and the unique word detecting circuit 26 execute different operations in the second embodiment from those in the first embodiment, the reference numbers of those circuits are changed into 17, 21, and 27, respectively.

Figure 7:
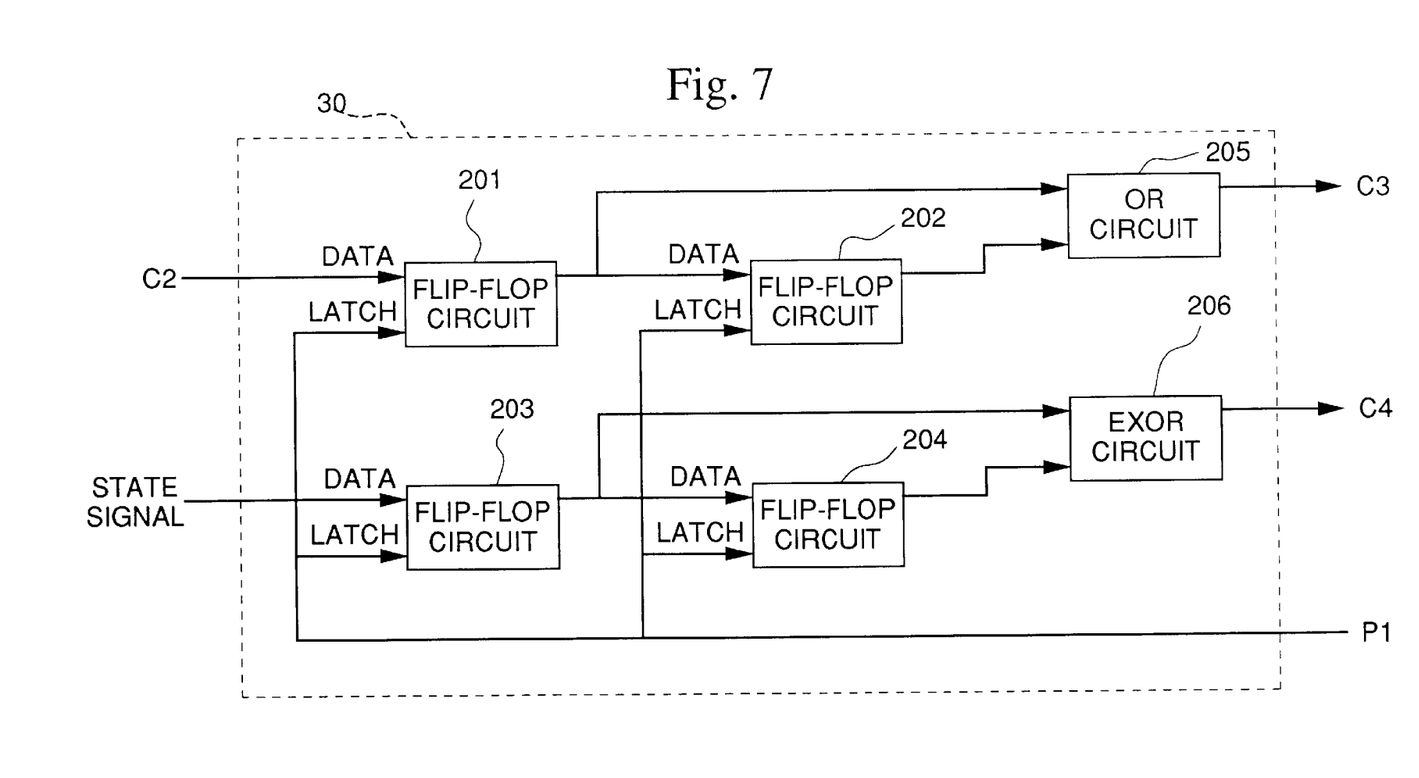
FIG. 7 is a diagram for explaining the operation of the second embodiment of the present invention.

The delay line 30 shown in FIG. 7 receives the control signal C2 and the state signal from the HDLC monitoring circuit, and also receives a pulse signal P1 from the unique word generating circuit 21. The purpose of the delay circuit 30 is to generate a control signal 3 which has delayed the switching from "1" to "0", and also generate a control signal 4, which indicates the change of the state signal when changed.

Figure 8:
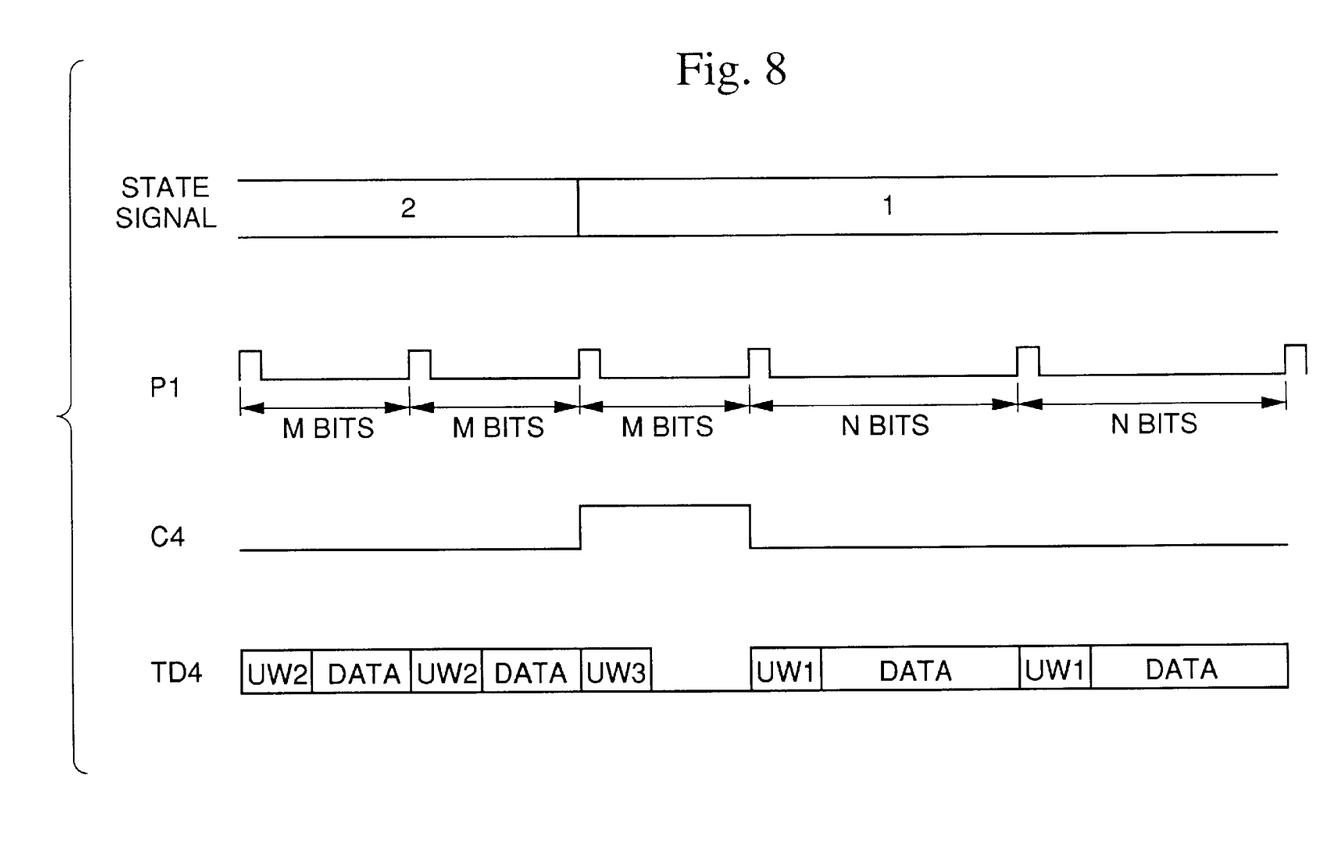
FIG. 8 is a diagram for explaining the operation of the second embodiment of the present invention.
Figure 9:
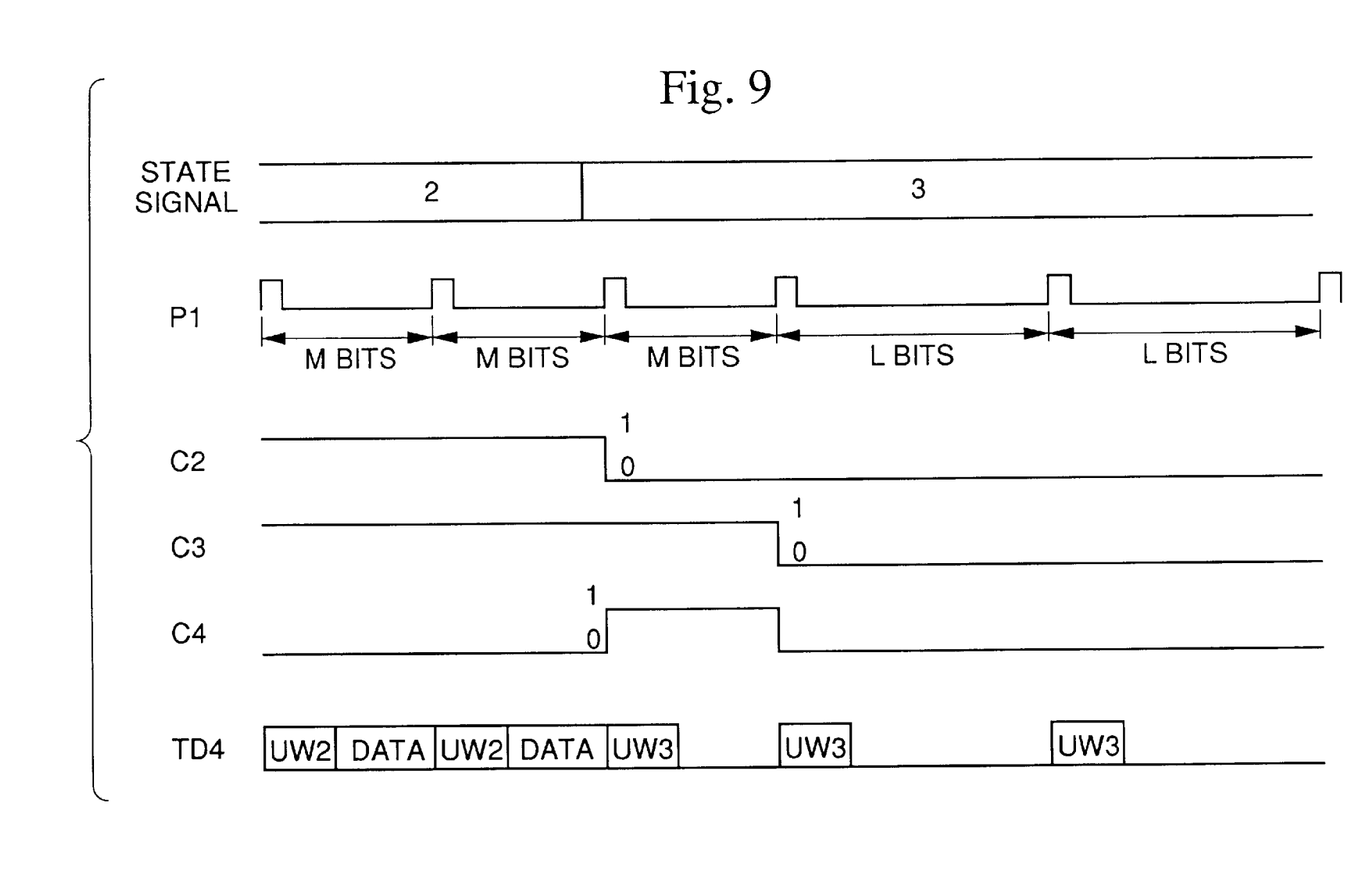
FIG. 9 is a diagram for explaining the operation of the second embodiment of the present invention.

The unique word generating circuit 21 outputs pulse signals P1, as shown in FIGS. 8 and 9, at the same intervals as those between the generating unique words (for example, if the unique word is UW2, the interval is M bits).

The pulse signals P1 input into the delay circuit 30 are input into latching terminals of the flip-flop circuits 201 to 204, as shown in FIG. 7. The flip-flop circuits 201 and 201 latch the control signal C2 and the flip-flop circuits 203 and 204 latch the state signals. A control signal C2 once latched at the flip-flop circuit 201 and a control signal latched twice by the flip-flop circuit 202 leaving a space from the control signal C2 by one unique word are input into the OR circuit 205, and the control signal C3 is output.

Thus, the control signal C3 is processed by the same operation as that of C2 in the first embodiment, when the control signal C2 is "1" or "0", and when C2 changes from "0" to "1". However, when the control signal C2 changes from "1" to "0" (when the state signal changes from 1 to 3, or from 2 to 3) the timing at which the control signal C3 changes to "0" is delayed for one unique word interval compared to the control signal C2.

A state signal latched once by the flip-flop circuit 203 and the state signal latched again by the flip-flop circuit 204 after an interval corresponding to one unique word are input into an EXOR circuit 206, which then outputs a control signal C4. Thereby, when the state signal output from the HDLC monitoring circuit 17 changes as shown in FIGS. 8 and 9, the control signal C2 is switched into "1" for an interval of one unique word. The unique word generating circuit 21 detects an occurance of the state transition, when the unique word generating circuit 21 recognizes such switching.

Next, the operation of the unique word generating circuit 21 is described. This unique word generating circuit 21 differs from that shown in FIG. 2 in that it inputs a control signal C4 and outputs a pulse signal P1. The operation of a circuit 21, when the state signal 3 is input, is the same as that destcibed in the first embodiment, and its explanation is omitted.

When the unique word generating circuit 14 is receiving the state signal 2, it checks the level of the control signal C4 for every M bits as shown in FIG. 8. When the unique word generating circuit 21 detects that the control signal C4 has changed to "1", it changes the type of the unique word to UW3 and outputs UW3 once to the multiplexing circuit 18. The generating circuit 14 reads the state signal after M bits, and if the state signal is 1, then starts the operation of the transmitting state 1 (see FIG. 8). If the state signal is 3, it outputs the state signal 3 and starts the operation of the transmitting state 3 (see FIG. 8).

FIG. 8 is a timing diagram showing the change from the state signal 2 to the state signal 1. As shown in FIG. 8, when the control signal C4 is "1", the output TD4 of the multiplexing circuit 14 is UW3, and when the control signal C4 becomes "0", the UW1 is transmitted.

In the first embodiment, when the state signal changes, the type of the unique word changes. However, in the second embodiment, an unique word UW3 which has a transmitting interval of M bits is inserted at the time the transmitting state changes.

The unique word generating circuit 14 checks the control signal C4 for every N bits, when receiving the state signal 1. When the control signal C4 changes to "1", it immediately confirms the state signal and, if the state signal is 3, then output UW3 to the multiplexing circuit 14. After outputting UW3 again after N bits, the operation of the transmitting state 3 is started. In contrast, if the unique word generating circuit 14 receives a state signal 2, it immediately outputs UW2 and the operation of the transmitting state 2 is started. When the state changes from 1 to 2, the same operation as that of the first embodiment is executed by re-sending the data so as to rapidly switching the unique word and also switch the transmitting interval to M bits.

As described above, in the second embodiment, the switching of the unique word UW is executed such that the unique word UW3 is always inserted when switching from the transmitting state 2 to 1 or 3, or switching from the transmitting state 1 to 3. This is to announce beforehand the change of the type of the unique word, which facilitates processing by the unique word detecting circuit 27.

Next, operations of the unique word detecting circuit 27 and the HDLC monitoring circuit 17 are described.

The operation of the HDLC monitoring circuit 17 is substantially the same as that of the first embodiment. However, in the second embodiment, the HDLC monitoring circuit 27 also monitors the transmitting data TD2 and the monitored results are reflected to the control signal C5 toward the unique word detecting circuit 27. The HDLC monitoring circuit 17 always monitors the transmitting data TD2 and switches the control signal C5 to "1", when the REJ command is included in the transmitting data, i.e. the outside data terminal 10 requires the opposite to re-send the data; and in other cases, switches the control signal C5 is switched to "0". As described in a later section, since UW2 is used when re-sending data, the above described switching is executed in order to instruct the unique word detecting circuit 27 to carry out an immediate search of UW2.

Although the unique word detecting circuit 26 (FIG. 2) of the first embodiment always detects three types of the unique words, the circuit 27 of the second embodiment only monitors two types of the unique word. This operation is described with reference to FIGS. 6 and 11.

Figure 6:
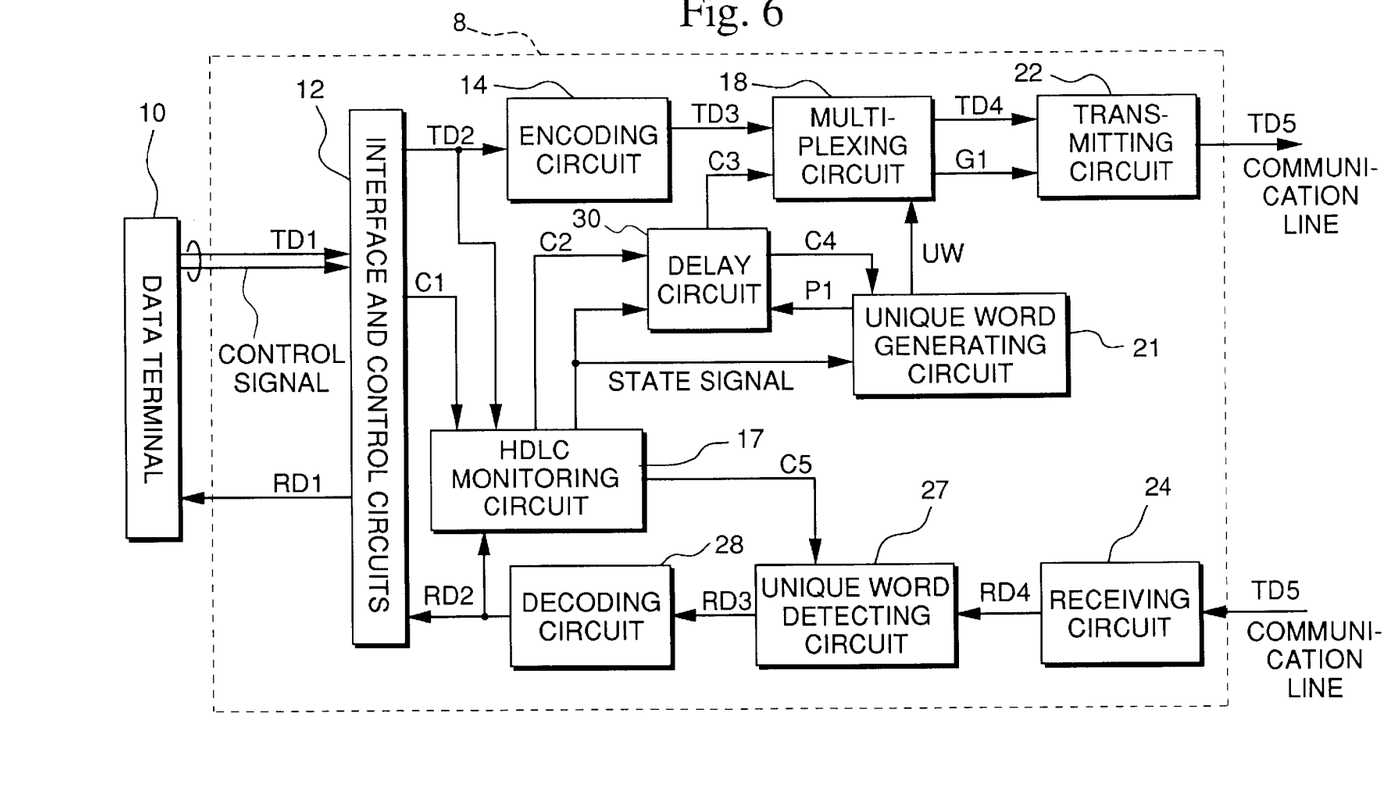
FIG. 6 is a block diagram showing the second embodiment of the present invention.
Figure 10:
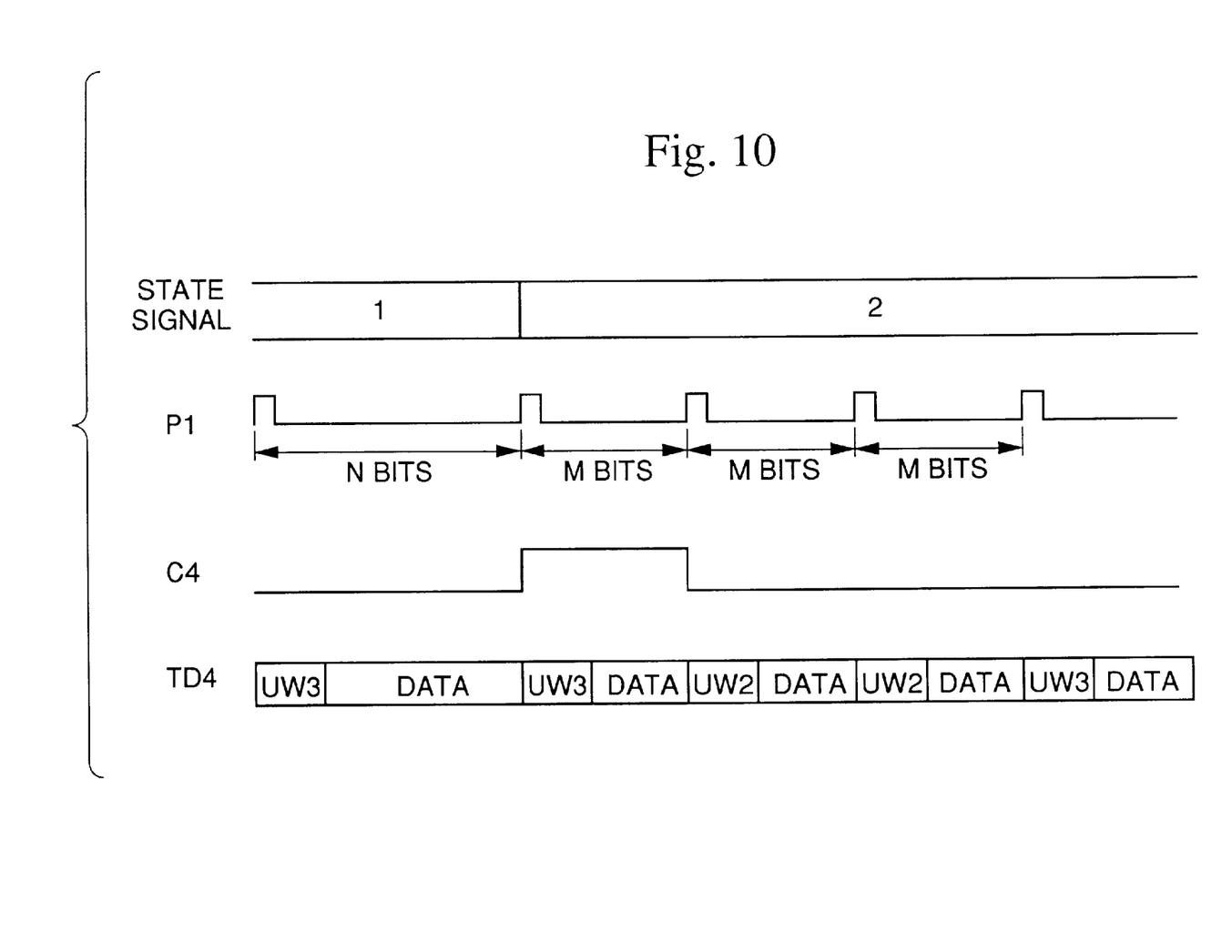
FIG. 10 is a diagram for explaining the operation of the second embodiment of the present invention.
Figure 11:
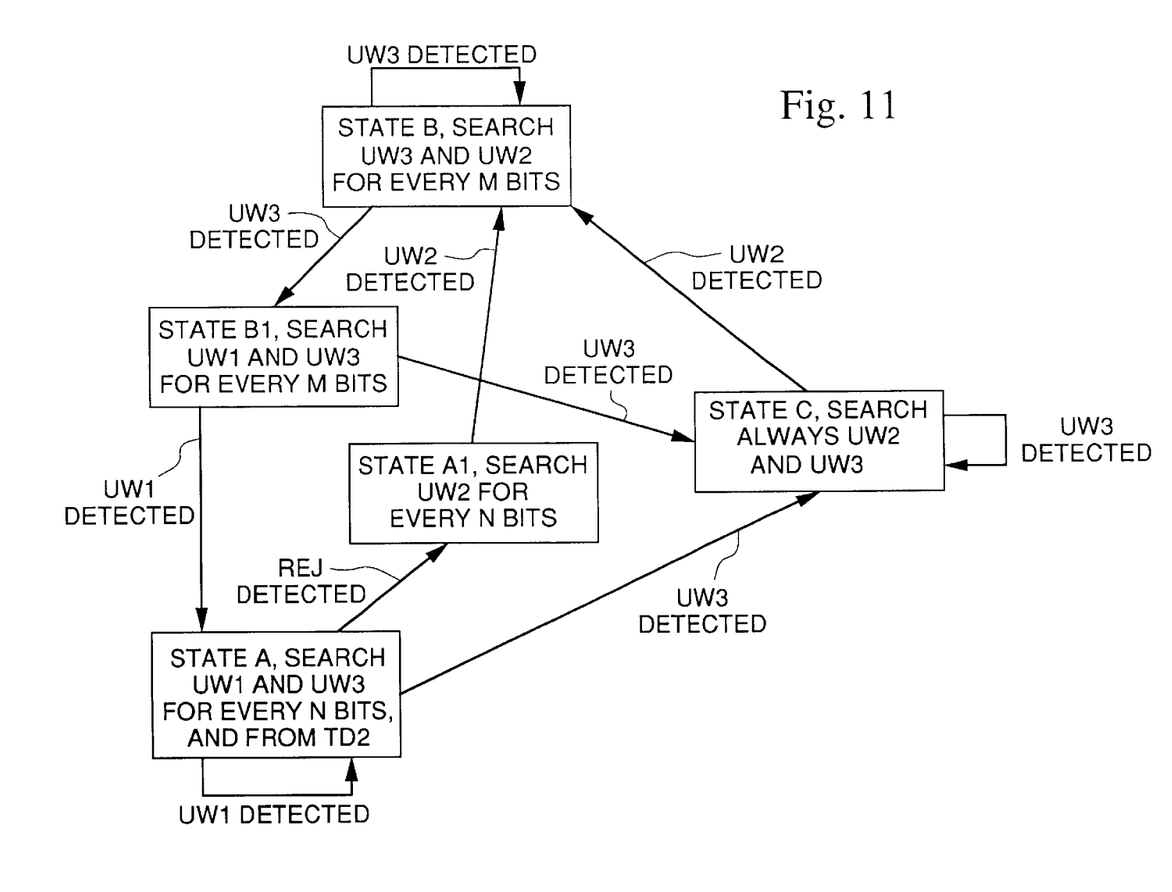
FIG. 11 is a diagram for explaining the operation of the second embodiment of the present invention.

When nothing is included in the received signals RD4 shown in FIG. 6, the unique word detecting circuit 27 is in the state of C shown in FIG. 10. When in the state C, the detecting circuit 27 always detects UW2 and UW3. When UW3 is detected, the detecting circuit 27 remains in the state C, and if UW2 is detected, the detecting circuit 27 transits to the state B.

In the state B, the detecting circuit 27 searches UW2 and UW3 every M bits. As described above, since a unique word UW3 is always inserted when the transmitting side is switched from UW2 to UW1, it is not necessary to search UW1 in the state B. When UW2 is detected, the detecting circuit 27 remains at the state B, and if UW3 is detected, the circuit 27 transits to the state B1. Subsequently, the circuit 27 searches UW1 and UW3 for the bit after M bits, and if UW1 is detected, the circuit 27 transits to the state A if UW1 is detected, and transits to the state C if UW3 is detected.

In the state A, UW1 and UW3, as well as the control signal CR5, are searched at every N bits. When the control signal CR5 is "0", and if UW1 is detected, then the circuit 27 remains at the state A; and if UW3 is detected, the state is switched to the state C. If the control signal CR5 is "1", the state is switched to the state A1, and UW2 is searched for the bit after the N bits and if UW2 is detected, the state shifted to the state B. Since the receiving data becomes unnecessary for a station at the time it has transmitted the REJ response, the unique word detecting circuit 27 immediately shifts to a waiting state to wait for UW2, because the opposite station will transmit a re-sending data by use of UW2.

Accordingly, the throughput at the unique word detecting circuit 27 can be reduced compared to that by the detecting circuit 26 of the first embodiment, because the number of unique word types searched at any time by the unique word detecting circuit 27 is reduced from the three in case of the detecting circuit 26 in the first embodiment to two unique words and tyowp.

The effect of the first embodiment of the present invention is brought about by setting N>M, that is, when the receiving condition of the opposite station is satisfactory, the amount of the transmitting data is increased as much as the decreasing number of transmitting unique words for increasing the throughput; and when the receiving condition is not satisfactory so that the transmitting condition is 2, the number of transmitting unique words is increased to more than that in the transmitted condition 1 so as to stabilize the transmission line.

The second effect of the first embodiment is that it is possible to minimize the addition of instruments for measuring the error rate or the S/N because these values are measured by monitoring the confirmation procedures in the existing HDLC protocols.

The effect of the second embodiment is that it is possible to reduce the throughput by the unique word detecting circuit to less than that in the first embodiment by reducing from 3 to 2 the number of types of the unique words, being searched at a time by the unique word detecting circuit.

What is claimed is:

1. A method for controlling data transmission in accordance with a quality of a communication line comprising transmitting a plurality of frames defined by High Level Data Link Control Procedures (HDLC) by dividing with unique words, the method comprising:

monitoring a quality of the communication line by monitoring a HDLC response in the received signal; and changing the number of bits between the unique words in accordance with the HDLC response.

2. The method of controlling data transmission of claim 1, wherein said HDLC response comprises one of RR (Receive Ready), RNR (Receive Not Ready), and REJ (Reject).

3. A transmitting and receiving system for transmitting and receiving a plurality of frames defined by a High Level Data Link Control Procedure (HDLC) by dividing said plurality of frames with unique words, the system comprising:

a HDLC monitoring circuit for detecting an HDLC response;

a unique word generating circuit for outputting a selected unique word among a plurality of unique words based on the HDLC response detected by said HDLC monitoring circuit;

a multiplexing circuit for multiplexing the unique word selected by said unique word generating circuit with a transmitting data; and a transmitting circuit for transmitting the output of said multiplexing circuit.

4. The transmitting and receiving system of claim 3, wherein said HDLC response comprises one of RR (Receive Ready), RNR (Receive Not Ready), and REJ (Reject).

5. The transmitting and receiving system of claim 3, wherein each of said plurality of unique words specify a bit length of the respective subsequent data.

6. The transmitting and receiving system of claim 3, further comprising a unique word detecting circuit for detecting a unique word in said HDLC response and wherein said unique word detecting circuit checks all of a predetermined plurality of unique words.

7. The transmitting and receiving system of claim 6, further comprising a means for reducing the number of unique words detected by said unique word detecting circuit.

8. A method for controlling data transmission, the method comprising:

monitoring a quality of a communication line by monitoring a HDLC response in a received signal transmitting a plurality of frames defined by a predetermined procedure divided by a plurality of unique words; and changing the number of bits between said plurality of unique words based upon said HDLC response.

9. The method of claim 8, wherein said predetermined procedure comprises a High Level Data Link Control Procedure (HDLC).

10. The method of claim 8, wherein said HDLC response comprises one of a receive ready response, a receive not ready response and a reject response.

11. The method of claim 8, wherein said transmitting comprises generating said plurality of unique words based upon said response.

12. The method of claim 8, wherein said transmitting comprises multiplexing said plurality of unique words with said plurality of frames.

13. The method of claim 8, wherein each of said plurality of unique words corresponds to said number of bits.

14. The method of claim 8, further comprising:

detecting a unique word in said received signal; and checking said unique word in said received signal.

15. A system for transmitting data, comprising:

a detector that detects a response included in a received signal;

a unique word generator that selects a unique word from a plurality of unique words in accordance with the detected response; and a transmitter that transmits a plurality of frames and said selected unique word, wherein the number of bits between the plurality of unique words is based upon said response.

16. The system of claim 15, wherein said received signal comprises a High Level Data Link Control Procedure (HDLC).

17. The system of claim 15, further comprising a multiplexer that multiplexes said selected unique word with said plurality of frames.

18. The system of claim 15, wherein said response comprises one of a receive ready response, a receive not ready response and a reject response.

19. The system of claim 15, wherein said selected unique word corresponds with a bit length of a respective subsequent data.

20. The system of claim 15, further comprising a unique word detecting circuit that detects a unique word in said received signal and that checks all of a predetermined plurality of unique words.

21. The system of claim 20, further comprising a reducing unit in communication with said unique word detecting circuit for reducing the number of unique words that are detected by said unique word detecting circuit.

22. A method for controlling data transmission in accordance with a quality of a communication line comprising transmitting a plurality of frames defined by High Level Data Link Control Procedures (HDLC) by dividing with unique words, the method comprising:

changing the number of bits between the unique words in accordance with the HDLC response, wherein said unique words divide said plurality of frames into a plurality of frame groups.

23. A transmitting and receiving system for transmitting and receiving a plurality of frames defined by a High Level Data Link Control Procedure (HDLC) by dividing said plurality of frames with unique words, the system comprising:

a HDLC monitoring circuit for detecting an HDLC response;

a unique word generating circuit for outputting a selected unique word among a plurality of unique words based on the HDLC response detected by said HDLC monitoring circuit;

a multiplexing circuit for multiplexing the unique word selected by said unique word generating circuit with a transmitting data; and a transmitting circuit for transmitting the output of said multiplexing circuit, wherein said unique words divide said plurality of frames into a plurality of frame groups.

24. A method for controlling data transmission, the method comprising:

transmitting a plurality of frames defined by a predetermined procedure divided by a plurality of unique words; and changing the number of bits between said plurality of unique words based upon said HDLC response, wherein said transmitting divides said plurality of frames into a plurality of frame groups using said plurality of unique words.

25. A system for transmitting data, comprising:

a detector that detects a response included in a received signal;

a unique word generator that selects a unique word from a plurality of unique words in accordance with the detected response; and a transmitter that transmits a plurality of frames and said selected unique word, wherein said selected unique word divides said plurality of frames into a plurality of frame groups.

* * * * *